United States Patent [19]
Hayashi et al.

[11] Patent Number: 5,114,667
[45] Date of Patent: May 19, 1992

[54] HIGH TEMPERATURE REACTOR HAVING AN IMPROVED FLUID COOLANT CIRCULATION SYSTEM

[75] Inventors: Takao Hayashi, Tokyo; Yasuo Osawa, Kure, both of Japan

[73] Assignees: The Japan Atomic Power Company; Babcock-Hitachi Kabushiki Kaisha, both of Tokyo, Japan

[21] Appl. No.: 645,250

[22] Filed: Jan. 24, 1991

[30] Foreign Application Priority Data

Jan. 26, 1990 [JP] Japan .................................. 2-16366

[51] Int. Cl.⁵ .............................................. G21C 15/18
[52] U.S. Cl. ...................................... 376/299; 376/381; 376/391; 376/393
[58] Field of Search ............... 376/383, 381, 382, 289, 376/291, 391, 298, 299, 402, 405, 393; 165/160, 135

[56] References Cited

U.S. PATENT DOCUMENTS

| | | | |
|---|---|---|---|
| 4,243,487 | 1/1981 | Schweiger | 376/298 |
| 4,863,676 | 9/1989 | Helm et al. | 376/299 |

*Primary Examiner*—Brooks H. Hunt
*Assistant Examiner*—Frederick H. Voss
*Attorney, Agent, or Firm*—Fay, Sharpe, Beall, Fagan, Minnich & McKee

[57] ABSTRACT

A high temperature reactor has a downflow type nuclear reactor provided at the top portion thereof with a gas inlet and a plurality of steam generators provided around the nuclear reactor. The steam generator has a heat insulation tube provided vertically from the bottom portion of the nuclear reactor to a level higher than the top gas inlet of the reactor, a heat exchanger provided in a descending gas flow path formed around the heat insulation tube, and a gas circulator provided at the bottom portion thereof for feeding a gas coolant to the gas inlet of the nuclear reactor, whereby said gas coolant, after being used for cooling the reactor core, delivered from the bottom portion of the reactor, flows into the heat insulation tube, flows upward to the top portion of the tube, is reversed in direction at the top end of the tube, then flows downward through the descending gas flow where the heat exchanger is provided, and is then recycled to the gas inlet flow path of the reactor by the gas circulator.

7 Claims, 3 Drawing Sheets

HIGH TEMPERATURE REACTOR HAVING AN IMPROVED FLUID COOLANT CIRCULATION SYSTEM

BACKGROUND OF THE INVENTION

1. Field of the Invention

The present invention relates to a high temperature reactor, particularly to a device having a means for circulating high temperature gas and working fluid heat-exchanged with the high temperature gas, and further, to steam generators and a circulating system, which are attached to a nuclear reactor.

2. Related Art Statement

As for a pressure vessel used in a nuclear reactor, it is required to use a prestressed concrete reactor vessel (hereinafter referred to as a "PCRV") for a medium-size or a large-size high temperature reactor having an output of 300 MWe or higher due to the size of a reactor core. In the PCRV type gas-cooled high temperature reactor, a device for driving a control rod or the like is provided above the reactor core, and a helium coolant which has come out of the reactor core and has a higher temperature enters from under the tube bundles of steam generators due to the positional relationship thereof.

FIG. 3 shows a conventional high temperature reactor. This reactor consists of a PCRV 33, a reactor core 31, a graphite reflector frame 32, steam generators 34, a heat transfer tube bundle 35, a feed water line 36, a steam line 37, a gas circulator 38, a cross head 39, a top penetration 40, and an auxiliary core-cooling system 41.

This high temperature reactor adopts a so-called downhill boiling system, in which water flowing in from the feed water line 36 to the upper portion of the heat transfer tube bundle 35 at the top of the steam generators 34 is heated into a two phase flow, to form super-heated steam which flows down through the heat transfer tube bundle 35, and is taken out of the bottom portion of the bundle through the steam line 37.

This downhill boiling system is unnatural from the viewpoint of heat flow dynamics, and the stability at the time of a low output is uncertain. Thus it is deemed that countermeasures therefore will be necessary.

FIG. 4 shows a block fuel-type high temperature reactor, in which 51 designates a reactor core, 52 a PCRV, 53 steam generators, 54 a heat transfer tube bundle, 55 and 56 a feed water line and a steam line, respectively, 57 a gas circulator, 58 a top penetration, and 59 an auxiliary core cooling system. In this high temperature reactor, both the feed water line 55 and the steam line 56 are provided at the bottom portion of the steam generators 53, and the downhill boiling occurs at least partially regardless of the flowing direction of the helium coolant in the steam generators 53.

Accordingly, in the conventional high temperature reactor, the working fluid becomes unnatural from the view point of the heat flow dynamics. And, the stability of the steam generators themselves at the time of the low output is uncertain.

When an abnormal state in the conventional high temperature reactor occurs, or the steam generators are operated at a lowered pressure or at a lowered temperature, or operated with the quantity of feed water increased, the fluidal instability takes place, heat transfer performance is decreased, and pressure loss in the tubes is increased. Further, when a feed water pump is stopped and feed water is supplied by a head difference, since the pressure loss in the tubes is increased due to the fluidal instability as described above, then the water pouring capacity is deteriorated.

Furthermore, according to the conventional device described above, the circulation of the gas between the nuclear reactor and the steam generators is conducted by a blower. In order to save the power of the blower, it is desirable to utilize the natural circulating force of the gas. U.S. Pat. No. 4,243,487 is a typical example in which the core cooling method by this natural circulator of the gas is adopted.

This U.S. Pat. No. 4,243,487 discloses a high temperature reactor, in which, in contrast to the downflow-type nuclear reactor, a blower is disposed at the bottom portions of the steam generators and a heat exchange portion for cooling the gas is provided above the level of a reactor core so that when the blower is stopped, the reactor core is cooled by the natural convection or the natural circulation of the gas.

Nevertheless, in this case, since a heat exchange portion for cooling is provided in a hot gas rising tube of the steam generators, the temperature is lowered in this portion and the rising force of the gas is impaired due to the increased gas density and the lowered pressure, whereby the circulation of the gas is limited to require the power of the blower to be large.

U.S. Pat. No. 4,476,089 discloses a nuclear reactor provided with a steam generator, in which a hot gas rising tube is made hollow and a heat exchange portion for cooling is disposed around the tube.

However, in this case too, the top end of the heat exchange portions of the steam generator is lower than a top gas inlet of the nuclear reactor, so it cannot be said that the natural circulating force of the gas is effectively utilized.

SUMMARY OF THE INVENTION

It is the first object of the present invention to provide a high temperature reactor of a downflow type provided with steam generators, wherein the natural circulating force of the gas is improved in such a manner that the power of the gas circulator can be decreased during normal operation and, even when the gas circulator is experiencing trouble, the circulation of the gas can be maintained.

It is the second object of the present invention to provide a high temperature reactor wherein, when the gas circulator is experiencing trouble or when an abnormal conditions take place, the natural circulating force of the gas can be increased.

It is the third object of the present invention to provide a high temperature reactor wherein even when a water pump is stopped, safety operation can be secured.

The above-described first object can be achieved by a high temperature reactor having a downflow type nuclear reactor provided at the top portion thereof with a gas inlet flow path and a plurality of steam generators provided around the nuclear reactor, wherein a heat insulation tube is provided vertically from the bottom portion of the nuclear reactor to a level higher than the top gas inlet flow path of the nuclear reactor, each of the steam generators has a heat exchanger provided in a gas-descending flow path formed around the heat insulation tube and a gas circulator for feeding a gas coolant to the gas inlet flow path provided at the bottom portion thereof, whereby the gas coolant, after cooling the reactor core, is delivered from the bottom portion of the reactor, flows into the insulation tube, flows upward to the top portion of the tube, reverses in the direction thereof at the top end of the tube then flows downward through the gas-descending flow path where the heat exchanger is provided, and is then recycled to the gas inlet flow path by the gas circulator.

Furthermore, the above-described object can be further effectively achieved by adopting a high temperature reactor characterized in that the nuclear reactor is provided with cold gas flow paths around the reactor core and is connected to the steam generators through concentric double-wall tube type cross ducts at the bottom portions thereof, and further, the following equation is satisfied:

$$\rho_1 H_1 < \rho_2 H_2$$

where $H_1$: A height from the center of the cross duct to the top gas inlet flow path;

$\rho_1$: An average gas density in the cold gas flow path of the height of $H_1$;

$H_2$: A height from the center of the cross duct to the top end of the heat exchange portion;

$\rho_2$: An average gas density in the gas downflow passage around the heat insulation tube of the height of $H_2$.

The above-described second object can be achieved by a high temperature gas reactor wherein the heat exchanger is a helical coil heat exchanger having a feed water inlet nozzle at the bottom portion thereof and a steam outlet nozzle at the upper portion thereof, said feed water inlet nozzle having a feed water line for pouring cold water into the inlet nozzle, said steam outlet nozzle having a steam line, and at least one of said feed water line and said steam line having a pressure control means.

The above-described third object is achieved by providing a water tank at the high temperature reactor so that water from the water tank is fed into the water feed line by a head difference.

The above-described high temperature reactor functions as follows.

(1) By use of the heat insulation tube in the steam generator, the hot gas delivered from the bottom portion of the nuclear reactor can be sent to the top of the steam generators with a low pressure loss and without losing a flow energy due to cooling on the way. Furthermore, the heat insulation film has an opening at the top end thereof above the level of the top gas inlet of the nuclear reactor, whereby the tube has an increased force for sucking the hot gas from the bottom portion of the nuclear reactor by a chimney effect. Further, the gas is cooled by the heat exchanger provided in the gas downward flow path and extended therein to a level above the top gas inlet of the nuclear reactor, whereby the head pressure of the gas can be effectively utilized, and the back flow pressure of the reactor core is controlled in association with the flow energy of the hot gas discharged from the heat insulation tube, thereby effectively intensifying the natural circulation and the natural convection.

Furthermore, by making the value of $\rho_1 H_1$ larger than $\rho_2 H_2$ as described above, the gas in the gas flow paths around the reactor core can be easily collected to the reactor core, thus intensifying the gas circulation.

(2) The above-described high temperature reactor is of an uphill boiling type wherein the steam generators are each provided at the bottom portion thereof with a water feed nozzle and provided at the top portion thereof with a steam nozzle, whereby the water is successively turned into a two phase flow and a superheated steam, so that no fluidal instability occurs. Therefore, the high temperature reactor can be operated in such a manner that the water temperature can be lowered by feeding the cold water and the temperature can be lowered by the pressure control means at the water side or the steam side, so that the cooling performance can be improved and the natural circulating force can be intensified. Furthermore, when the water is fed from the bottom portion of the steam generator, the counter-flow heat exchange is performed, whereby the temperature of gas from the top to the bottom can be lowered, thus intensifying the natural circulating force.

(3) Furthermore, in the above-described steam generators, no fluidal instability takes place, the pressure loss is lowered and the water feed nozzle is disposed at the bottom portion, so that, even when the water pump is in trouble or abnormal conditions take place, the water can be fed from the water tank by virtue of the head difference.

DESCRIPTION OF THE PREFERRED EMBODIMENTS

The embodiments of the present invention will hereunder be described with reference to the accompanying drawings.

Figure 1:
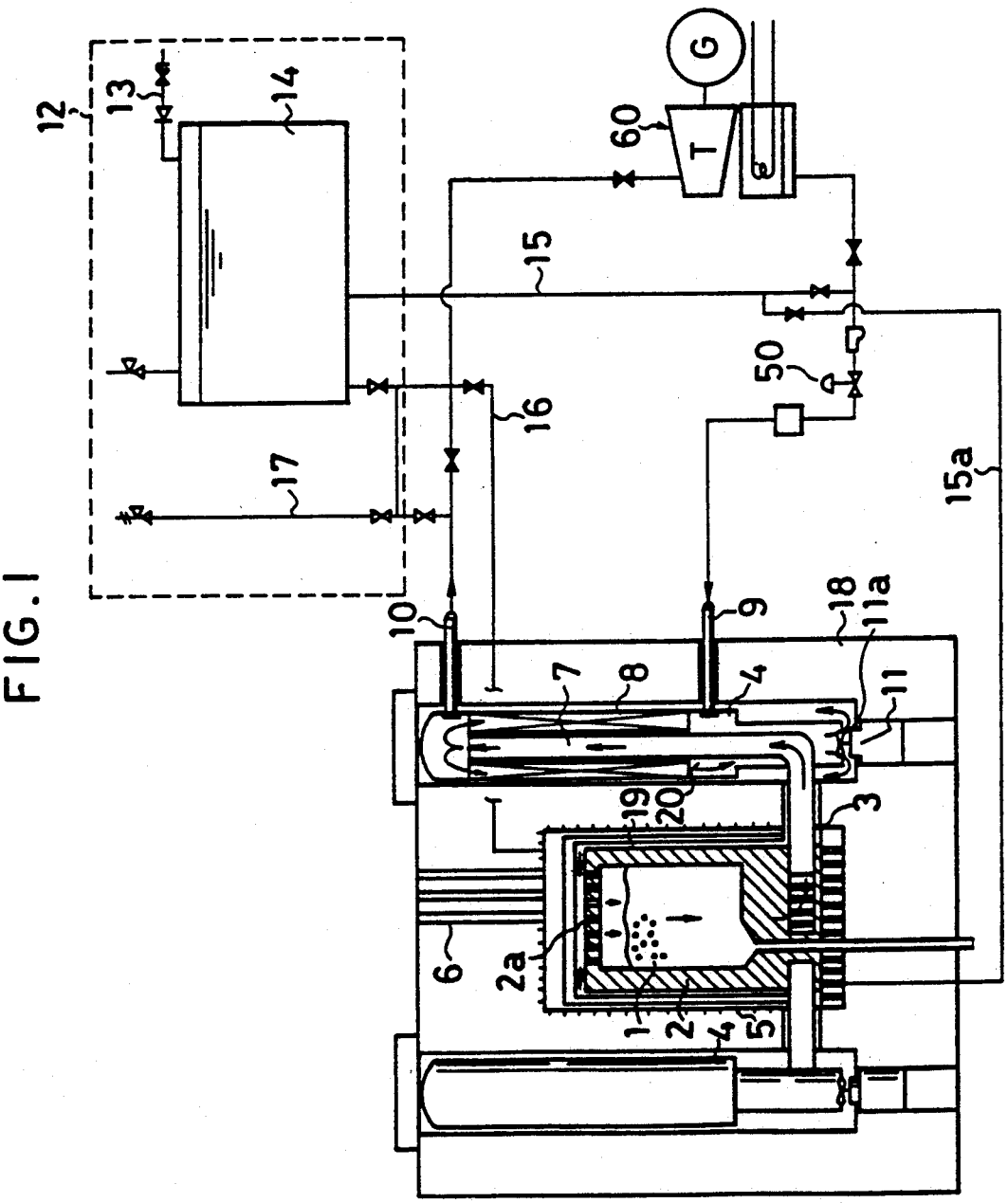
FIG. 1 is a schematic block diagram showing a high temperature reactor including a nuclear reactor of Pebble-bed type using PCRV, steam generators provided therearound and a system for removing decay heat, which utilizes the latent heat of steam as an embodiment of the present invention.

Referring to the high temperature reactor of FIG. 1, the interior of a reactor core 1 surrounded by a graphite reflector frame 2 having gas inlet path 2a on the top thereof is in communication with steam generators 4 through a cross duct 3. A liner cooling system 5 is provided with a gas flow path 19 around the outer periphery of the graphite reflector flame 2 and a penetration 6 is disposed on the top of the graphite reflector frame 2.

In the central portion of the steam generators 4 which are disposed at a higher level than the reactor core 1, a heat insulation tube 7 which is heat insulated on the inner surface thereof, is disposed vertically and the top end thereof is opened at the top portion in a shell of the steam generators 4. The bottom portion of the heat insulation tube 7 is bent and in communication with an inner tube of a double tube type cross duct 3. A heat transfer tube bundle (helical heat exchanger) 8 is disposed in a gas-descending path 20 formed around the heat insulation tube 7, that is between the heat insulation tube 7 and the shell of the steam generator 4. A feed water inlet nozzle 9 leading to a feed water line is provided below this heat transfer tube bundle 8, and a steam outlet nozzle 10 leading to a steam line is disposed above the heat transfer tube bundle 8. The shell of the steam generator 4 is reduced in diameter below the heat transfer tube bundle 8 and is opened at the bottom end thereof, and at an opening portion thereof is provided with a gas circulator 11 having an agitating vane 11a. The opening portion of the shell of the steam generator 4 is in communication with the outer annular portion of the cross duct 3 leading to the gas flow path 19 around the reactor core 1. A plurality of steam generators 4 are disposed around the reactor core 1. Further, in FIG. 1, reference numeral 12 indicates a decay heat removing system which is provided with a water tank 14 having an opening 13. A pipeline 15 from this water tank 14 is connected to the intermediate portion of the feed water line 9 from a turbine system 60, and a by-pass tube 15a branched from the pipeline 15 is in communication with the liner cooling system 5 disposed around the outer periphery of the graphite refrector frame 2. Furthermore, a pipeline 16 from the water tank 14 is also connected to the top portion of the liner cooling system 5. The steam line 10 has a by-pass tube 17 branched from a pipeline leading to a turbine system 60. Further, numeral 18 designates a PCRV.

Function of the high temperature reactor with the above-described arrangement will hereunder be described.

First, operation in the normal condition will be described. Heat is generated by the nuclear reaction in the reactor core 1 of pebble bed type, installed in the PCRV 18 and disposed in the graphite reflector frame 2. This heat is cooled by a pressurized helium coolant introduced through gas inlet 2a at the top of the reactor core 1. The helium coolant thus heated flows out of the bottom of the reactor core 1 into the steam generators 4 through the inner tube of the cross duct 3. The hot helium gas which flows into the steam generators 4 is passed through the heat insulation tube 7, flows up to the top portion of the steam generators 4, reverses its path at the open end of the tube 7, is passed through gas-descending flow path 20 provided with the heat transfer tube bundle 8, is cooled while flowing downward to be a low temperature helium gas, is sucked and discharged by the gas circulator 11, and is circulated to the reactor core 1 through the outer annular portion of the cross duct 3, the gas flow path 19 and the gas inlet 2a of the reactor core.

The opening portion of the heat insulation tube 7 and the top end of the heat exchanger (heat transfer tube bundle 8) are disposed at a higher level than that of a gas inlet 2a provided at the top of the nuclear reactor. In order to intensify the gas circulation, it is desirable to satisfy the following relationship:

$$\rho_1 H_1 < \rho_2 H_2$$

where
$H_1$: A height from the center of the cross duct to the top gas inlet flow path;
$\rho_1$: An average gas density in the cold gas flow path of the height of $H_1$;
$H_2$: A height from the center of the cross duct to the top end of the heat exchange portion;
$\rho_2$: An average gas density in the gas-descending flow path around the heat insulation tube of the height of $H_2$.

Further, if there is no limitation in the arrangement of devices, the entire heat exchange portions are disposed above the gas inlet 2a, so that the gas circulation can be further intensified.

Feed water is taken from feed water pipe 9; fed to the heat transfer tube bundle 8 having a helical-shape flowed upward therein, and taken out of steam pipe 10 provided at the upper portion of the steam generator 4. In the steam generator 4, by adopting the above structure, water and steam flows in a state of uphill boiling which is natural and reasonable from a viewpoint of heat fluid dynamics, and disadvantages phenomenon like downhill boiling which is unnatural to this sort of steam generator is avoided.

According to the embodiments of the present application, cold water is poured into the steam generator 4 by use of the pipeline 15 shown in FIG. 1, so that the temperature of water fed into the steam generators 4 can be lowered. The pressure or the evaporating temperature in the steam generator 4 can be lowered by use of a water pressure control means 50 or a steam pressure control means 17, whereby the cooling performance of the steam generator is enhanced, and the gas circulation can be intensified. Further, since fluidal instability does not occur, the amount of feed water can be increased.

When the water pump is experiencing trouble, the water in the water tank 14 can be delivered to the steam generator 4 through the feed water line only by a head difference. This is because no fluidål instability occurs in the steam generator and the pressure loss is low.

Figure 2:
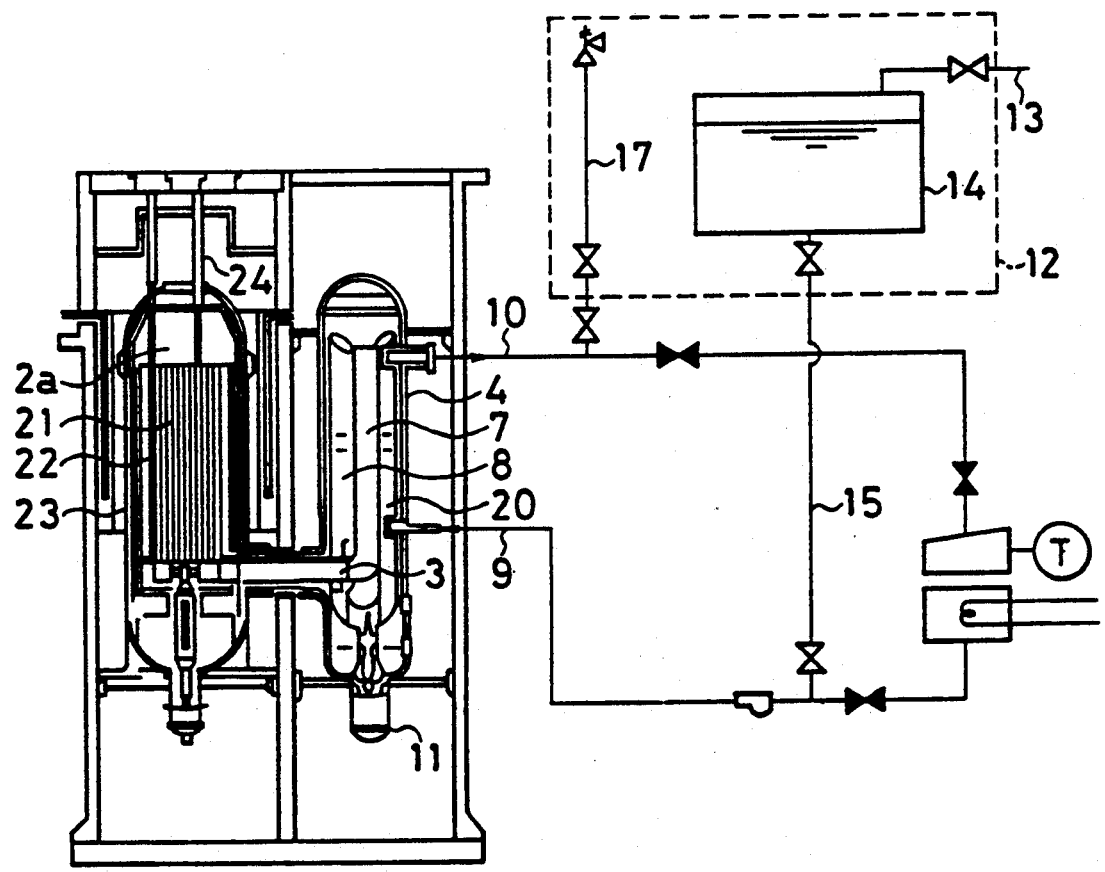
FIG. 2 is a schematic block diagram of a high temperature reactor including another embodiment of the steam generator and a system for removing decay heat, which utilizes the latent heat of steam in the high temperature reactor using a steel pressure vessel according to the present invention.
Figure 3:
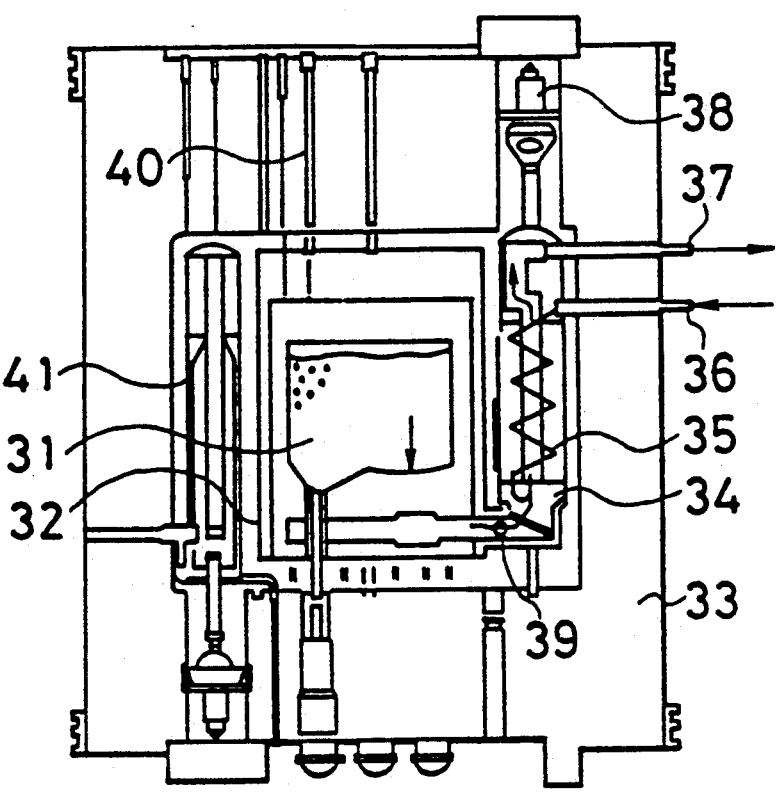
FIG. 3 is a schematic block diagram showing the conventional PCRV type pebble bed fuel type high temperature reactor.
Figure 4:
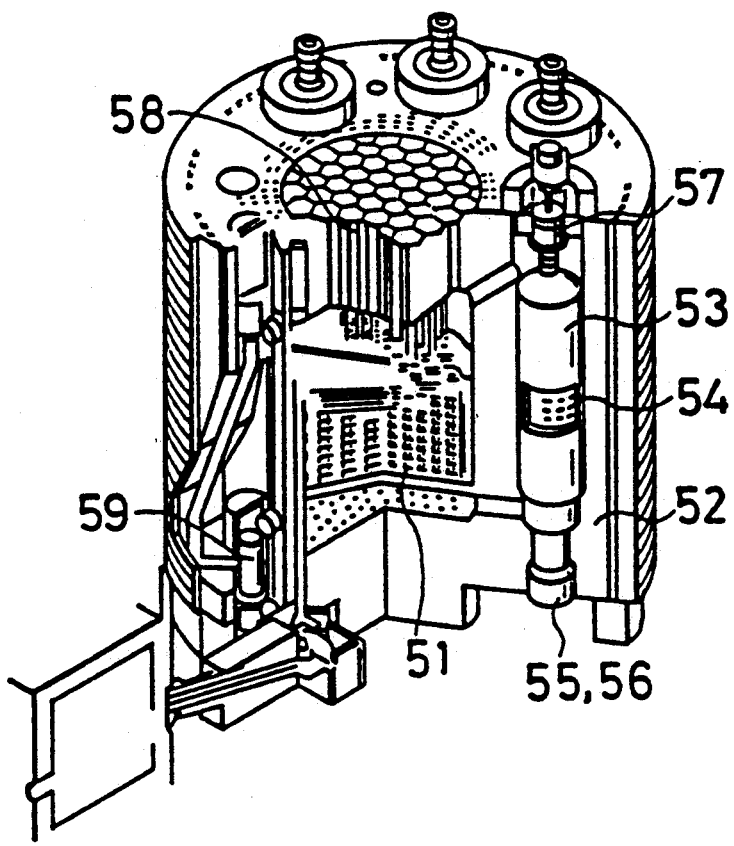
FIG. 4 is a schematic block diagram showing the conventional PCRV type block fuel high temperature gas reactor.

FIG. 2 is a schematic block diagram showing another embodiment of the high temperature reactor, of the present invention in which a block fuel type steel pressure vessel is used.

Referring to FIG. 2, a reactor core 21 and a graphite reflector frame 22 are covered by a steel pressure vessel 23, and a control rod introducing tube 24 can be inserted into the reactor core 21. Since steam generators 4 and a decay heat cooling system are essentially identical with ones shown in FIG. 1, the same reference numerals as in FIG. 1 are used.

In this embodiment, the heat generated by the nuclear reaction in the reactor core 21 is transferred to a pressurized helium coolant flowing down through the reactor core 21. The hot helium gas coolant thus heated flows into steam generators 4 through a cross duct 3. Then the hot helium gas coolant flows upward through a heat insulation tube 7 reached to the top portion of the steam generators 4, is reversed and passed through the outside of a heat transfer tube 8, heats water and steam while flowing downward and is cooled into a low temperature helium gas. The low temperature helium gas is boosted by the gas circulator 11, passed through the outer annular portion of the cross duct 3, and circulated to the reactor core 21 again.

According to this embodiment, water is taken in from the feed water line 9 at the bottom portion of the steam generators 4, flowed up to the helical heat transfer tube bundle 8, and taken out of the steam line 10 at the top thereof, so that a phenomenon such as unnatural downhill boiling can be avoided.

The countermeasures in installation and the behavior at an abnormal occasion will hereunder be described with reference to FIG. 1. First, for an emergency in the gas circulation system such as non-actuation of the gas circulator 11, consideration is given to the construction of the steam generators 4 such that the position of installation thereof is as high as possible relative to the position of the reactor core 1. Thus the heat transfer tube bundle 8 in the steam generator 4 can make the natural circulation drive as large as possible relative to the reactor core 1. Furthermore, as shown as an example in the drawing, the gas circulator 11 is provided at the bottom to make it possible for the low temperature helium coolant to be delivered to the reactor core 1. Furthermore, as for the flow path to the reactor core 1 a natural circulation is formed.

Next, for an emergency of an abnormal state of the circulation system on the water side such as a trouble in a cooling water driving pump and the like, a large quantity of water from the water tank 14 storing water held in a large quantity is fed to the feed water line 9 through the pipeline 15, whereby the decay heat can be continuously removed by diffusing vaporization heat of the water, and by natural circulation force due to natural flow by heat flow dynamics in the steam generators 4, without using driving force of a pump and the like, for a long period of time. Incidentally, in the similar manner, the decay heat can be removed statically by feeding the water from the water tank 14 to the liner cooling system 5 through the pipelines 15a, 15 and 16.

Further, water inlet 13 is provided on the water tank 14 in order to feed water such as water for fire fighting from the outside. Thus the decay heat removing performance can be assured semipermanently.

Furthermore, in this embodiment, description has been given to the application of the invention to the PCRV type high temperature reactor using pebble bed fuel as shown in FIG. 1. However, the invention can be applied to the PCRV type high temperature reactor using block fuel, the block fuel type nuclear reactor having the steel pressure vessel as shown in FIG. 2 and further to the pebble bed fuel type high temperature reactor as well.

As has been described hereinabove, according to the present invention, the flow of the water and steam in the steam generators are performed such that the flow of the water (sub-cooled water) is fed at the bottom portion and the flow of the steam is discharged from the top portion, whereby the unnatural and undue problem of heat flow dynamics resulting from the fluidal instability of the working fluid, which has heretofore been caused by the downhill boiling, can be solved. Thus the countermeasures in the operation and installation of the high temperature reactor can be taken more easily.

Further, even if such a situation takes place that a trouble is caused in a water passing system such as one in the pump, the natural water flow and the natural circulation force of the cooling gas of the reactor core are secured, and further if the decay heat removing system is changed to one utilizing the latent heat of system by use of a water tank, decay heat removing performance can be effected perfectly.

What is claimed is:

1. A high temperature reactor having a downflow-type nuclear reactor, comprising: a top gas inlet flow path provided at a top portion of the nuclear reactor; a gas outlet flow path provided at a bottom portion of the nuclear reactor in communication with said top gas inlet flow path; a plurality of steam generators provided around the nuclear reactor; a heat insulation tube provided vertically from the bottom portion of said nuclear reactor to a level higher than the top gas inlet flow path of said nuclear reactor, said steam generators each having a gas-descending flow path formed around the heat insulation tube; means for flowing a gas coolant from said top gas inlet flow path to said bottom gas outlet to thereby cool said nuclear reactor by absorption of heat therefrom into said gas coolant; means for flowing the thus-heated gas coolant from said bottom gas outlet flow path into said heat insulation tube; means for flowing said heated gas coolant up through said heat insulation tube, without substantially cooling said heated gas coolant during said upward flow, to said level higher than said top gas inlet flow path; means for flowing said heated gas coolant from said heat insulation tube down through said gas descending flow path and through a heat exchanger contained therein to thereby cool said heated gas coolant; and gas circulator means for recirculating said cooled gas coolant from said heat exchanger to said top gas inlet flow path.

2. A high temperature reactor according to claim 1, wherein said nuclear reactor has a cold gas flow path around the reactor core, said cold gas flow path being connected to said steam generators through concentric double-wall tube type cross ducts at the bottom portions thereof.

3. A high temperature reactor according to claim 2, wherein the following equation is satisfied by the high temperature reactor:

$$\rho_1 H_1 < \rho_2 H_2$$

where
$H_1$: A height from the center of the cross duct to the top gas inlet flow path;
$\rho_1$: An average gas density in the cold gas flow path of the height of $H_1$;
$H_2$: A height from the center of the cross duct to the top end of the heat exchange portion; and
$\rho_2$: An average gas density in the gas-descending flow path around the heat insulation tube of the height of $H_2$.

4. A high temperature reactor according to claim 1, wherein said heat exchanger is a helical coil heat exchanger having a feed water inlet nozzle at a bottom portion thereof and a steam outlet nozzle at an upper portion thereof, said feed water inlet nozzle having a first feed water line for receiving cold water into the inlet nozzle, said steam outlet nozzle having a steam line, and at least one of said feed water line and said steam line having a pressure control means.

5. A high temperature reactor according to claim 4, wherein said reactor is provided with a water tank having a second feed water line leading to a liner cooling system of the nuclear reactor, and connected with said first feed water line of the heat exchanger, and said steam line is provided with a steam discharge line.

6. A high temperature reactor according to claim 4, wherein said pressure control means is a pressure control valve.

7. A high temperature reactor according to claim 1, wherein said heat exchangers are arranged above the top gas inlet flow path to enhance gas coolant circulation.

* * * * *